Dec. 22, 1925.
L. R. RUTHENBURG
1,566,285
SELF PROPELLED VEHICLE
Filed Nov. 20, 1922     4 Sheets-Sheet 4
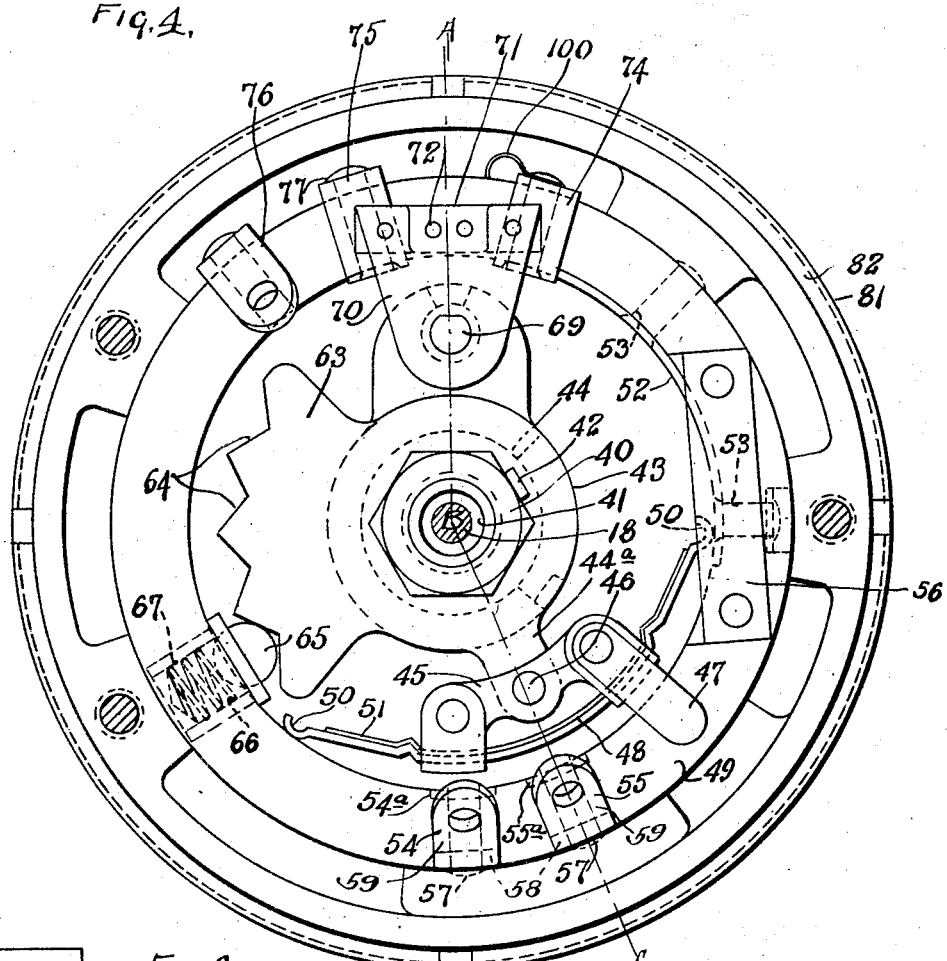
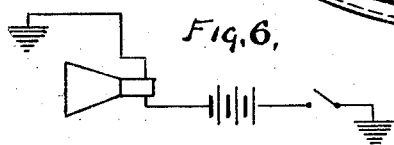
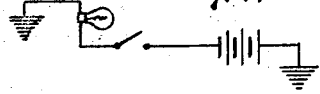
Inventor
Louis R. Ruthenburg.
Attorneys Patented Dec. 22, 1925.

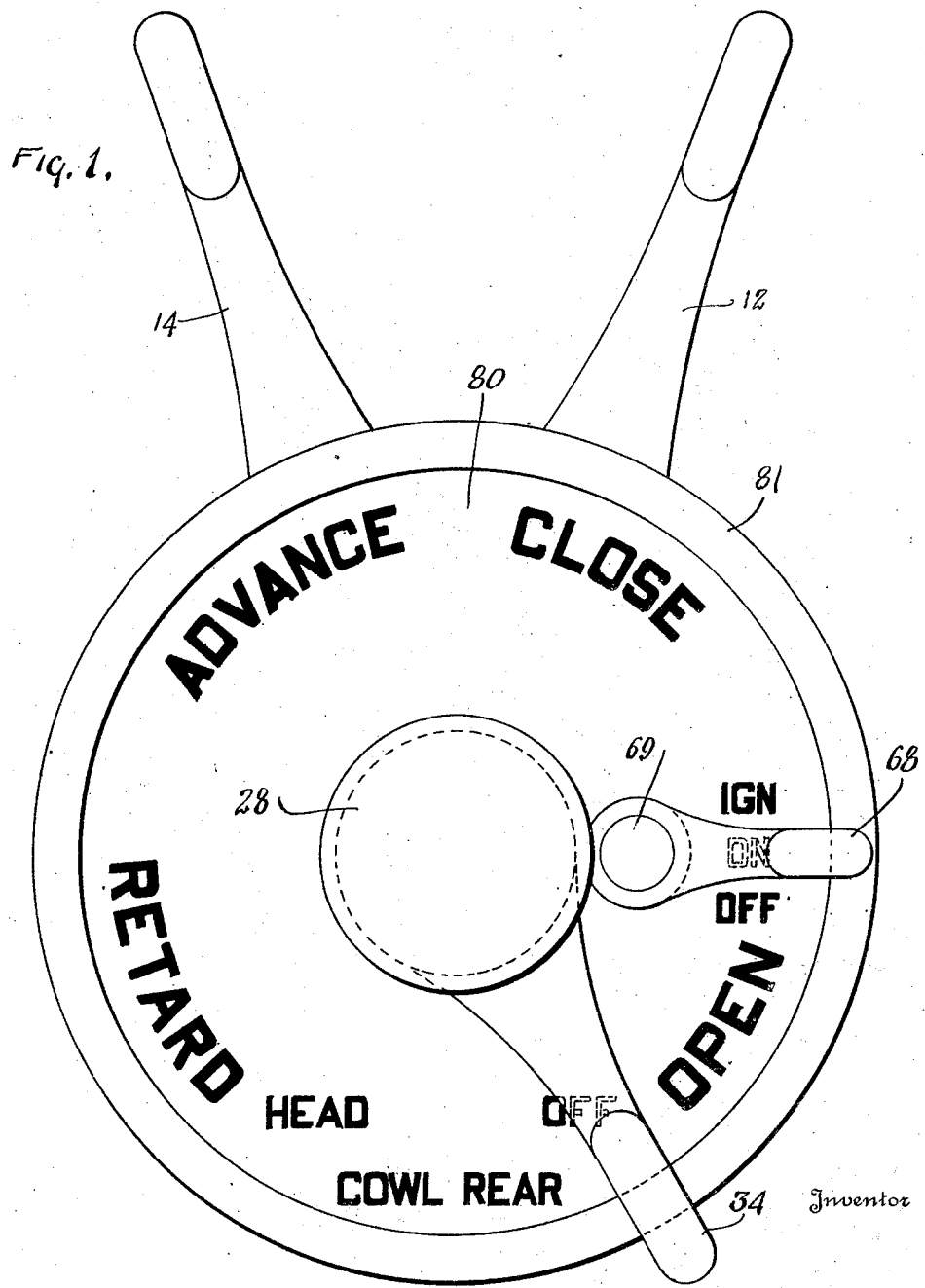

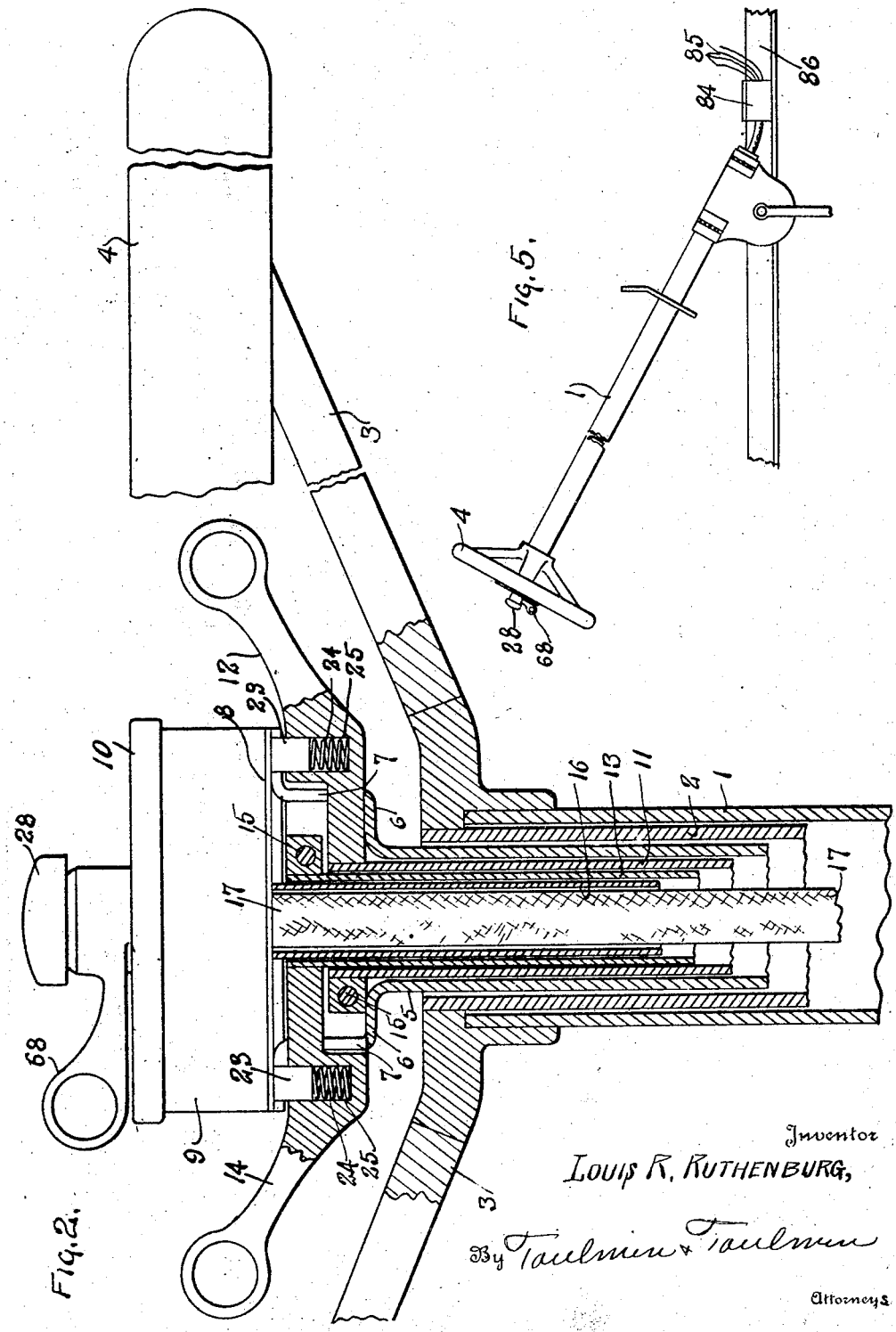

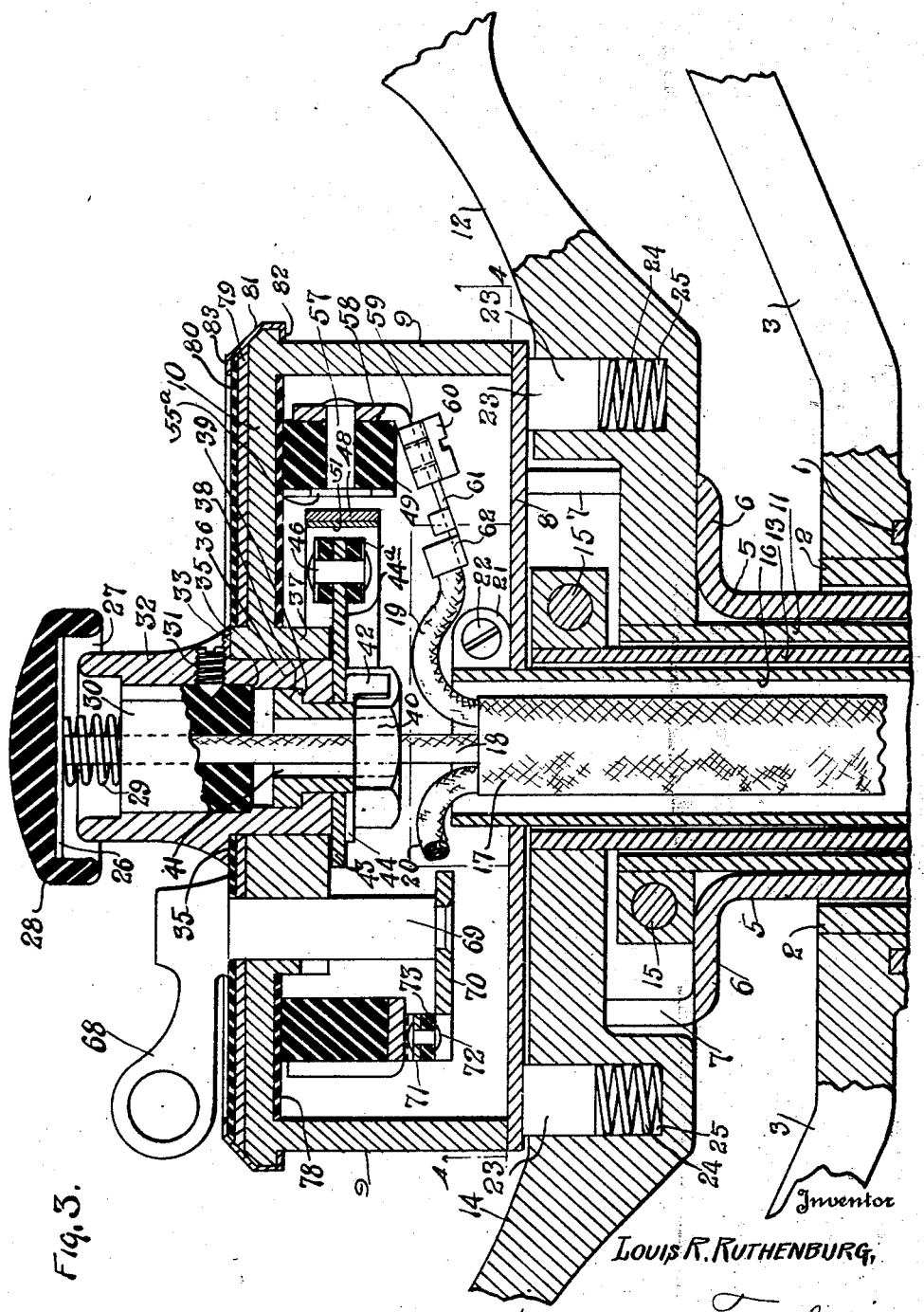

1,566,285

UNITED STATES PATENT OFFICE.

LOUIS R. RUTHENBURG, OF DAYTON, OHIO.

SELF-PROPELLED VEHICLE.

Application filed November 20, 1922. Serial No. 602,309.

*To all whom it may concern:*

Be it known that I, LOUIS R. RUTHENBURG, a citizen of the United States, residing at Dayton, in the county of Montgomery and State of Ohio, have invented certain new and useful Improvements in Self-Propelled Vehicles, of which the following is a specification, reference being had therein to the accompanying drawing.

My invention relates to self-propelled vehicles and in particular to mechanism for controlling the operation of such vehicles.

It is my purpose to locate control elements of a self-propelled vehicle in a position readily accessible to the operator thereof, which may be operated without the necessity of diverting the attention of the operator from the control of the steering wheel. It is a further object of my invention to reduce the necessity for the movement of the operator away from his steering wheel to operate other essential controlling means of the vehicle.

It is my purpose to combine all manual controls into one complete unit which are essential in the operation of an automobile, and to mount this unit in the center of the automobile steering wheel, so that all controls are immediately accessible to the operator and can be operated by moving the hand momentarily from the steering wheel, rather than necessitating the operator to lean forwardly or laterally to reach some control lever on the dashboard.

It is a further object of my invention to provide all of such essential manual controls on the steering wheel, centrally located above it directly in front of the operator so that there will be no necessity for body wiring or any connection of such wiring to the body. It is my object therefore to provide such an arrangement that the body may be mounted on the chassis with an entire elimination of the connections now known in the art, which must be made on the body when it is mounted on the chassis for connecting the manual controls, wiring and the like. It is my object thus to facilitate production by enabling the body to be a complete unit in itself, and the chassis and its operating mechanism to be a complete unit, eliminating the tedious connections heretofore made, which materially impeded production.

It is a further object to so arrange the mechanical and electrical units of this control on the steering wheel that they will be supported by the steering wheel column itself without any additional support, additional conduits and the like. It is a further object to so install the electrical apparatus that a single conduit will be used which will be thoroughly protected by the remainder of the mechanism, which conduit can be conveyed through the base of the steering column directly to a distribution box where the various wires, suitably marked, can be conveyed to the respective parts of the remainder of the apparatus with a minimum chance of wear, short-circuiting, damage by oil and water, and the like. It is my object also by this arrangement to eliminate any injury to the electrical lines by the natural movements between the body and the chassis, which have heretofore in the art been a source of difficulty in the operation of such vehicles.

Therefore I am enabled to provide in the chassis assembly the steering wheel, the spark and gas controls, the horn, the controlling mechanism for the lights and the controlling mechanism for the ignition, the distribution box, fuses and all the cables. This improves the appearance of the car by removing a number of the control elements from the dash or instrument board.

It is also my object to so arrange this mechanism on the steering wheel that it will not interfere with the operation of the steering wheel, and it will be adapted to fit in a very restricted area.

Referring to the drawings:

Figure 1 is a plan view of the exterior of the steering wheel control box.

Figure 2 is a side elevation of the complete assembly of steering wheel and control box, with the steering wheel partially broken away, and the steering wheel support and associating tubular members in section, and parts of the control levers in section.

Figure 3 is a section on the line *a—b—c* of Figure 4, showing in detail the arrangement of the parts, conduits and the like, in the control box.

Figure 4 is a bottom plan view with the control levers removed and the cables eliminated in order to disclose the relative position of the several contacts. In order to disclose this mechanism, the bottom plate of the box has been removed. This figure is taken on the line 4—4 of Figure 3, looking in the direction of the arrow.

Figure 5 is a side elevation of the steering column and junction box, illustrating diagrammatically the method of mounting the entire assembly of wires and manual controls on the chassis and steering column.

Fig. 6 is a typical wiring diagram of the horn circuit.

Fig. 7 is a typical wiring diagram of the lighting circuit.

Referring to the drawings in detail:

1 designates the steering column casing of tubular form. Within this casing is a tubular member 2 to which the spokes 3 of the steering wheel 4 are attached. This tubular member 2 is connected to the steering mechanism at the bottom of the column which may be of any desired character. Within the tubular member 2 is a third tubular member 5 that is bent outwardly as at 6, at the top and upwardly, as at 7, to form a support for the bottom 8 of the switch box. This switch box is composed of side walls 9 and a top 10 preferably of a single piece of material such as a die casting.

Within the tubular member 5 is another tubular structure 11 which is attached to the throttle lever 12, which controls the supply of fuel for the engine. Within the fuel supply tube 11 is a fifth tube 13 which is attached to the spark control lever 14. The means of attachment of the levers 12 and 14 may be of any desired character such as a split collar, having a clamping bolt 15. The innermost tubular member is designated 16 and has its open upper end communicating with the switch box, and its lower end open for the exit of the cable and covering therefor, in a manner which will be hereinafter described. This cable covering is designated 17 and contains the horn, lighting and ignition cables which are generally designated respectively 18, 19 and 20.

The wiring tube 16 is held in position with reference to the switch box and its bottom 8 by a clamp 21 and clamping screw 22.

The arms 12 and 14 for the gas and spark control respectively carry spring pressed plungers 23 pressed outwardly by the helical springs 24 into yielding engagement with the bottom 8 of the switch box, thus positioning the levers as desired when released by the operator and maintained in that position until moved to a new position. The plungers 23 and springs 24 are contained in a chamber 25 located in the body of the respective arms 12 and 14.

Turning to the switch box, it will be seen that the cable for the horn, which cable is designated 18, is connected at its upper end to a contact plate 26, which is located in the bottom of the cup 27. This cup is located on the interior of the horn button 28. The horn button is of any desired insulating material such as bakelite and the like. The horn button is maintained in its uppermost position by the helical spring 29 which engages with the bottom of the cup or with the plate 26 at one of its ends and at the other rests upon an insulating support 30 which consists of a bakelite plug positioned by the set screw 31 in the projecting collar 32, which is mounted upon and seated in the top 10 of the switch box. The cable 18 passes through this insulating plug 30. The shoulder 33 on the interior of the projecting tubular member 32 also serves to support and position the plug 30.

It will be understood that this collar 32 also serves as a hub for the attachment of the lighting control lever 34. This collar or hub has a shoulder 35 which determines the extent to which it projects into the switch box. This projection consists of a tubular member 36 bearing against a collar 37 carried by the top 10 of the switch box. A steel insert 38 is located within 36 and positioned therein by the shoulder 39 which forms a part of 36 and which engages the corresponding shoulder upon the insert 38. This steel insert being of stronger material than the die cast parts serves as the support upon which the retaining nut 40 is threaded. It will be understood that the cable 18 passes through an aperture 41 in both the steel insert and the nut 40. The nut 40 is prevented from rotation by the retaining finger 42. 43 designates the contact supporting plate mounted on this steel insert, while 44 is the lock washer to which the finger 42 is attached and of which it is an integral part. This plate 43 is preferably made of a steel punching, which carries a lug 44$^a$ on one side. This lug 44$^a$ supports a cross arm 45 which is pivotally attached thereto by the rivet 46, or by any similar means. This cross arm has means for supporting a contact plate 47 and a contact plate 48. This contact plate 48 rides on the inner wall of a ring 49 which is suspended from the top wall of the switch box. This ring is of insulating material and carries upon it a plurality of contacts. The contact plate 48 has a contact head 50 at either end thereof. It is backed by a tension spring 51 to maintain its contact heads 50 in yielding engagement with the interior wall of the ring 49 as the supporting arm 45 rocks with it on 44$^a$ and in particular, in engagement with the contact strip 52, which is retained by the rivets 53 on the inner wall of the ring 49.

Mounted upon the outer wall of the ring 49 are the cable connections; the member 54 is connected to the cowl lights, 55 is connected to the head lights, and the contact plate 56 is connected to the tail light in circuit with which the instrument light is preferably included. The contact strip 52 is connected to the battery by means of a suitable wire 100 attached thereto. The battery is grounded and the remainder of the cable connections can be accordingly made, according to well known practice. It will be noted that the cable connections such as at 54 and 55 are so arranged that the contact plates 54ª and 55ª are on the inner wall of the ring 49, and are retained in position by transverse rivets 57 passing through the ring and clamping on the outside thereof, suitable cable connections consisting of plates 58 that are bent inwardly beneath the ring 49, as at 59. The clamp 60 secures the plate 61, which is connected to the cable 19, to the inwardly bent member 59 at 62. The other cables are likewise connected, and pass downwardly through the cable housing 17. Connected to the plate 43 is a projecting portion 63 having a plurality of teeth 64 on the periphery thereof, the plate being segmental in shape. A ball 65 rides over these teeth and is held in engagement therewith by a helical spring 66 working in a socket or chamber 67 in the ring 49. This provides the necessary snap action to locate the parts in their respective positions.

Turning to the mechanism for controlling the ignition circuit (see Figures 3 and 4), it will be observed that there is a handle 68 provided for this control which has a shaft 69 which projects downwardly through the top 10 of the switch box. Carried by 69 is an arm 70 which has on its outer end a contact plate 71. This contact plate is mounted upon the arm 70 by rivets 72. The contact plate 71 is insulated from 70 by the insulating plate 73. 71 is adapted to span the gap between the contact plate 74, which connects with the battery and the ignition contact plate 75 which has its cable connected to the clamp 76. This plate 75 is retained on the ring 49 by the bolts or rivets 77.

It will be observed that the plate 71 will connect the battery plate to the ignition plate, or disconnect it as the lever 68 is moved from one position to the other. The cable 20 is connected to 76. This cable 20 is one of the cables that is located in the housing 17 within the wiring tube 16.

It will be understood that the under side of the top 10 of the switch box is provided with an insulating plate 78. This insulating ring 49 may be suspended from the switch box in any desired fashion.

The top of the switch box is provided with a cap plate 79 and a name plate 80, which carries the various legends which are necessary in such an arrangement. This name plate may be made of any desired material. It is retained in place by the ring 81, one flange of which, such as 82, engages the switch box, and the other flange, such as 83, engages the legend plate. It will thus be seen that I have provided in one unit on top the steering wheel closely adjacent the operator's hands and vision, all controls for the horn, ignition, lighting, spark, and fuel.

At the bottom of the steering column, is the flexible housing designated 17 through which the cables pass directly to a junction box 84, from which the various cables, such as 85, are conveyed to their respective parts of the engine. This junction box is preferably mounted upon an inner wall of the frame member of the chassis, such as 86. It will be observed that the body can be mounted upon the chassis, or moved without disturbing the wiring in any particular. I thus eliminate the body wiring, which is a long and tedious process that materially slows up production.

While I have shown and described certain features as constituting my invention, it will be understood that parts have been shown for purposes of illustration only, and that I do not desire to be limited to such details, as obvious modifications will occur to a person skilled in the art.

Having thus fully described my invention, what I claim as new and desire to secure by Letters Patent, is:—

1. The combination with a fixed tubular member; of a circular switch housing fixed on the upper end of said tubular member, a plurality of tubular members surrounding the first tubular member in concentric relation, control levers each fixed to one of the last mentioned tubular members and extending outwardly from beneath the switch housing, and friction resiliently urged means carried by the control levers and engaging the bottom of the housing at points exteriorly of the fixed tubular member.

2. The combination with a fixed tubular member; of a circular switch housing fixed on the upper end of said tubular member, a plurality of tubular members surrounding the first tubular member in concentric relation, control levers each fixed to one of the last mentioned tubular members and extending outwardly from beneath the switch housing, and friction means carried by the control levers and engaging the bottom of the housing, said levers having recesses in their upper sides to receive the friction means, each friction means comprising a plunger projecting from a respective recess and bearing against the housing bottom at points exteriorly of the fixed tubular member, and a spring interposed between the lower end of the plunger and the bottom of the respective recess.

In testimony whereof, I affix my signature.

LOUIS R. RUTHENBURG.